(12) United States Patent
Baskin et al.

(10) Patent No.: US 9,682,657 B1
(45) Date of Patent: Jun. 20, 2017

(54) RUNNING BOARD AND LOADING RAMP WITH SLIDING WIDTH ADJUSTMENT

(71) Applicant: AISIN TECHNICAL CENTER OF AMERICA, INC., Northville, MI (US)

(72) Inventors: Bradley Baskin, Ann Arbor, MI (US); Katsuhiko Takeuchi, Canton, MI (US); Eric Archambeau, South Lyon, MI (US); Joseph Elghoul, Livonia, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 14/963,996

(22) Filed: Dec. 9, 2015

(51) Int. Cl.
   *B60P 1/43* (2006.01)
   *B60R 3/00* (2006.01)

(52) U.S. Cl.
   CPC .......... *B60R 3/002* (2013.01); *B60P 1/43* (2013.01)

(58) Field of Classification Search
   CPC ..... B60P 1/43; B60R 3/00; B60R 3/02; B60R 3/002; B60R 3/007
   USPC ........................................................ 280/166
   See application file for complete search history.

(56) References Cited

U.S. PATENT DOCUMENTS

| | | | |
|---|---|---|---|
| 1,091,214 A * | 3/1914 | Gruber | B60R 3/002 280/169 |
| 1,334,565 A * | 3/1920 | Spiro | B60R 3/002 280/169 |
| 4,934,721 A * | 6/1990 | Flores | B60R 3/002 182/90 |
| 6,135,472 A * | 10/2000 | Wilson | B60R 3/02 280/164.1 |
| 6,203,040 B1 * | 3/2001 | Hutchins | B60R 3/002 182/90 |
| 6,389,629 B1 * | 5/2002 | Schouest | B60P 1/43 119/849 |
| 6,520,523 B2 * | 2/2003 | Beck | B60R 3/007 108/44 |
| 6,588,782 B2 * | 7/2003 | Coomber | B60R 3/002 280/163 |
| 6,742,793 B2 * | 6/2004 | Henriksen | B60R 3/002 280/163 |
| 6,880,843 B1 * | 4/2005 | Greer, Jr. | B60R 3/02 280/166 |
| 7,168,721 B2 * | 1/2007 | Mulder | B60R 3/002 280/163 |
| 7,334,807 B2 * | 2/2008 | Mulder | B60R 3/002 280/163 |
| 7,637,518 B2 | 12/2009 | Adair | |

(Continued)

*Primary Examiner* — J. Allen Shriver, II
*Assistant Examiner* — Brian Cassidy
(74) *Attorney, Agent, or Firm* — Oblon, McClelland, Maier & Neustadt, L.L.P.

(57) ABSTRACT

A running board apparatus including a first component with a hollow cross-section having an open end, the first component extending in a longitudinal direction; a second component with a closed cross-section that slides relative to the first component in a lateral direction, the second component extending in the longitudinal direction; and a positioning device with a first end attached to the first component and a second end attached to the second component. The positioning device is configured to move the second component with respect to the first component in the lateral direction and lock the second component and the first component in a plurality of positions.

9 Claims, 14 Drawing Sheets

(56) References Cited

U.S. PATENT DOCUMENTS

| | | | |
|---|---|---|---|
| 7,708,294 B2 | 5/2010 | Demick | |
| 7,717,445 B2 | 5/2010 | Peterson et al. | |
| 8,016,309 B2* | 9/2011 | Flajnik | B60R 3/002 |
| | | | 280/163 |
| 8,177,247 B1* | 5/2012 | Carr | B60R 3/02 |
| | | | 280/163 |
| 8,231,134 B2* | 7/2012 | Huang-Tsai | B60R 3/00 |
| | | | 280/163 |
| 8,297,635 B2* | 10/2012 | Agoncillo | B60R 3/02 |
| | | | 280/163 |
| 8,342,550 B2* | 1/2013 | Stickles | B60R 3/00 |
| | | | 280/163 |
| 9,162,625 B2* | 10/2015 | Watanabe | B60R 13/04 |
| 2006/0208449 A1* | 9/2006 | Kuo | B60R 3/002 |
| | | | 280/163 |
| 2009/0044729 A1 | 2/2009 | Navarre et al. | |
| 2012/0104718 A1* | 5/2012 | Alvarez | B60R 3/00 |
| | | | 280/163 |
| 2012/0169024 A1* | 7/2012 | Verhee | B60R 3/02 |
| | | | 280/166 |
| 2015/0203041 A1* | 7/2015 | Meszaros | B60R 3/002 |
| | | | 280/166 |
| 2016/0023608 A1* | 1/2016 | Carr | B60R 3/02 |
| | | | 280/166 |

* cited by examiner

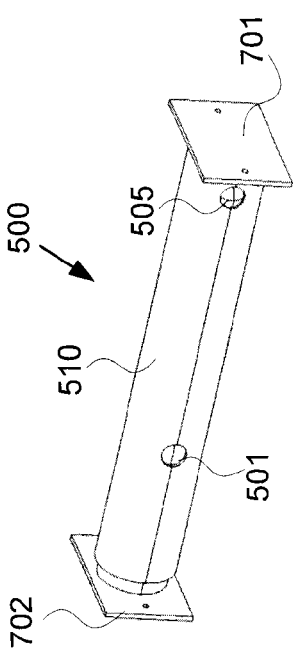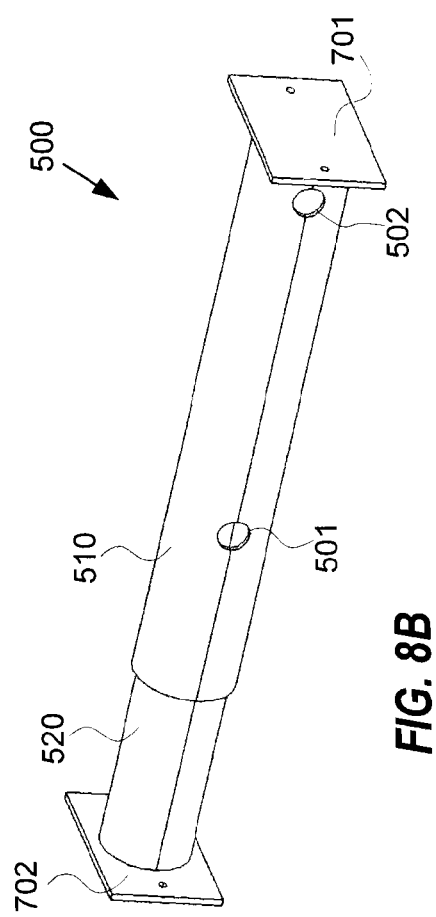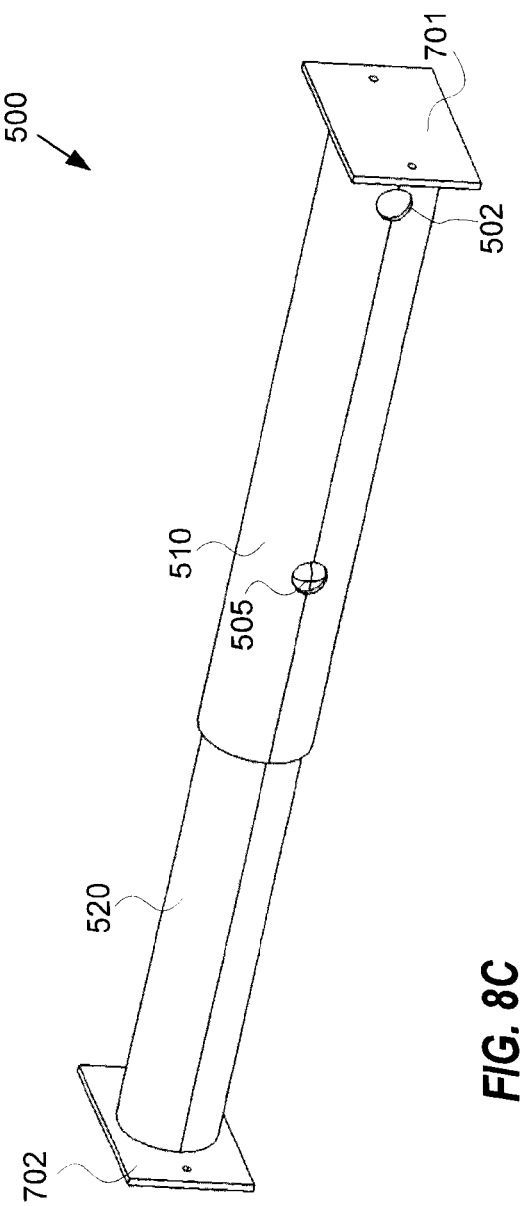
FIG. 8A
FIG. 8B
FIG. 8C

RUNNING BOARD AND LOADING RAMP WITH SLIDING WIDTH ADJUSTMENT

BACKGROUND

Field of the Disclosure

This application relates generally to improvements to a running board and a loading ramp for a vehicle. More particularly the present disclosure relates to improvements related to width adjustment and multi-functional running board and a loading ramp for a vehicle.

Description of the Related Art

Modern day utility vehicles such as pickup trucks and SUVs typically carry relatively heavy machinery, construction materials, and/or recreational vehicles such as three-wheel or four-wheel all-terrain vehicles (ATVs), motorcycles, and snowmobiles. To load and unload such items, as well as to assist vehicle occupants to enter and exit the elevated passenger compartment or cabin portion of the vehicle, vehicles often utilize one or more entry-assist mechanisms.

A vehicle is typically fitted with side platforms or a running board that extend lengthwise beneath and alongside the passenger compartment of the vehicle at a position adjacent to the passenger doors in order to provide a convenient step surface. Running boards have also been used for the loading and unloading of cargo area. Running boards may be used to create a ramp between a road surface and the elevated level of the truck bed or cargo area. Such ramps can be transported within a vehicle, or can be securely clamped or bolted to the vehicle when needed.

In U.S. Pat. No. 7,717,445 B2, a removable side step including two elongate section hinges together is described. However, the hinges render load bearing component structurally weak. Furthermore, the removable side step requires a special attachment bracket to connect to the vehicle. The removable side step in U.S. Pat. No. 7,717,445 B2 is difficult to fit onto and remove from the brackets. Also, the tailgate must be modified for attachment as a ramp. A stepping surface and a ramp surface are the same and no traction is provided, which can be difficult to move medium and large equipment up the ramp.

In U.S. Pat. No. 2009/0,044,729 A1, a multifunctional running board that can be used as a ramp is described. The running board has single platform, which can be removably attached to a vehicle using a pin, bolt, or knob. Further, the running board includes a storage compartment that can house a ramp or other items. The width of the platform cannot be adjusted when used as a ramp and narrow when used as a step. It is always narrow, which may not be ideal for medium and large equipment loading. Further, there are no features to prevent vibration, rattle, and noise. A modified tailgate is required for attachment as a ramp.

In U.S. Pat. No. 7,637,518 B2, a utility ramp and running board system are described. The utility ramp has two folding portions at the ends. The folding portion has an internal mechanism including a spring and two links so that it grips a bracket to attach to the side of the vehicle. The folding portions also provide an entry and exit transition for the ramp on the ground and at the tailgate. The utility ramp in U.S. Pat. No. 7,637,518 B2 does not have adjustable width. It is always narrow, which is not good for medium and large equipment loading. Further, the folding portions can easily be damaged since they are part of the ramp, which may cause failure of attachment while in use.

In U.S. Pat. No. 7,708,294 B2, a detachable dual use platform apparatus that can be locked to a vehicle with a key. When unlocked, the extrusion can be removed from the brackets and used as a loading ramp. The platform U.S. Pat. No. 7,708,294 B2 does not have an adjustable width.

A running board that can be easily used as a ramp for loading equipment into the tailgate or another compartment of a vehicle is needed. Further, for loading items of different sizes, the width should be adjustable There remains a continuing need to provide improved running boards having multiple utility and easily adjustable. A ramp with light mass and the high load carrying capacity and an improved strength and performance is needed.

SUMMARY

According to an embodiment of the present disclosure, there is provided a running board apparatus. The running board apparatus includes a first component with a hollow cross-section having an open end extending in a longitudinal direction, a second component with a rectangular cross-section extending in a longitudinal direction and inserted in the first component from the open end, and a positioning device with one end attached to the first component and an opposite end attached to the second component, wherein the positioning device is configured to move the second component with respect to the first component in a lateral direction and lock the second component and the first component in a narrow position or a wide position.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 8A illustrates the narrow position configuration of the position guiding device according to an embodiment of the present disclosure.

FIG. 8B illustrates an intermediate position of the position guiding device according to an embodiment of the present disclosure.

FIG. 8C illustrates the wide position configuration of the position guiding device.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

The "longitude" or "longitudinal" generally refers to a direction along the length of a component, and "lateral" refers to a direction perpendicular to the "longitudinal" direction.

Figure 1:
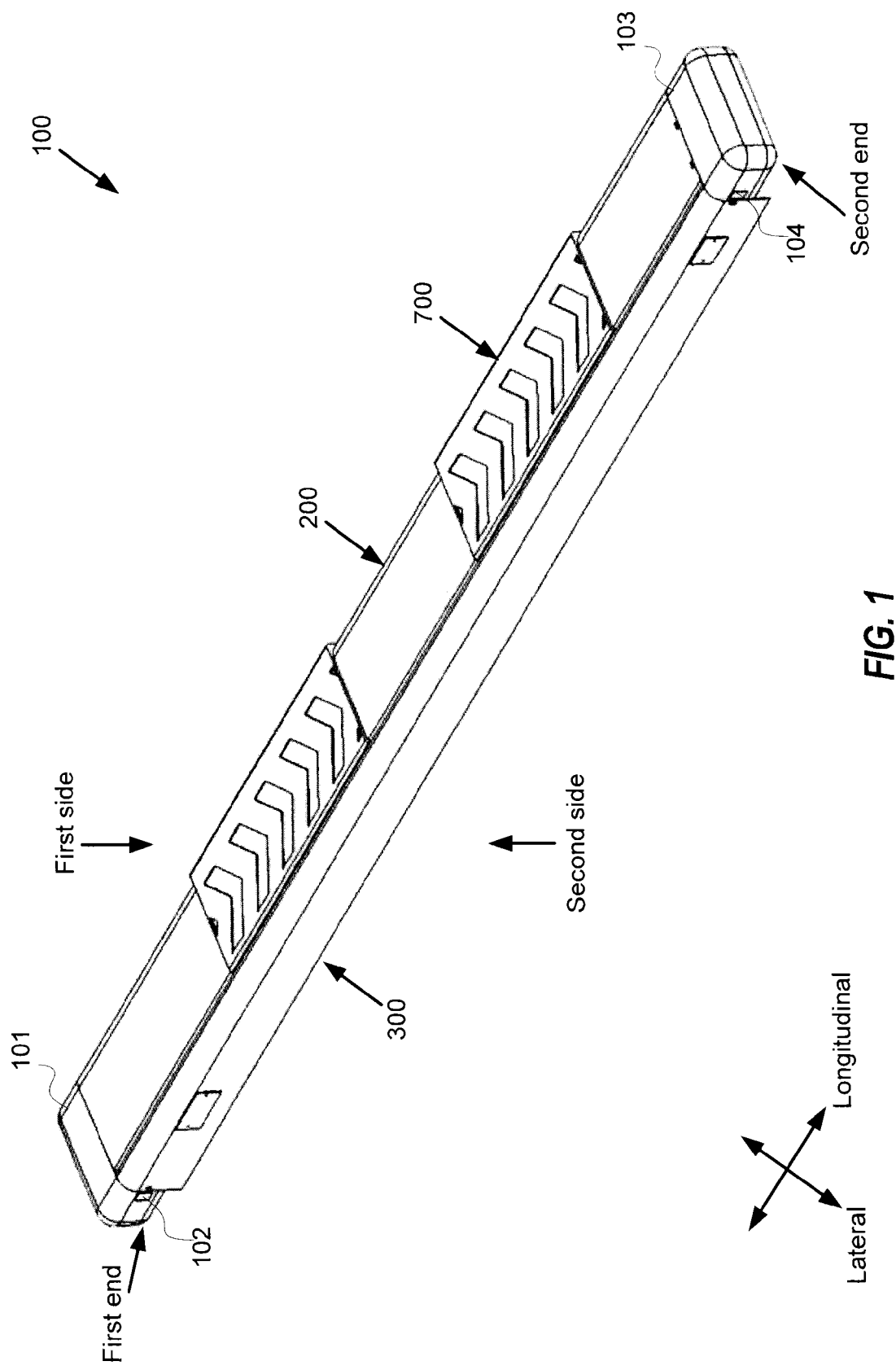
FIG. 1 illustrates a running board in a narrow position according to an embodiment of the present disclosure.

FIG. 1 illustrates a running board 100 in a narrow position according to an embodiment of the present disclosure. A running board 100 can include a female component 200, a male component 300, and a position locking device 400 (not shown in FIG. 1). Optionally, the running board 100 can also include a position guiding device 500 (not shown in FIG. 1), a traction mark 600 (not shown in FIG. 1), a stepping pad 700, and traction insert 800. The female component 200 and the male component 300 can be connected by the position locking device 400 and the position guiding device 500. Further, the female component 200 and the male component 300 can include an interlocking mechanism to prevent separation of the female component 200 and the male component 300. The running board 100 is assembled such that the male component 300 can slide with respect to the female component 200, while the position locking device 400 and the position guiding device 500 can lock the male component 300 and the female component 200 in a particular position. As such, a width of the running board 100 can be increased and decreased as necessary. The running board 100 can be in a narrow position, a wide position or an intermediate position. The narrow position makes the running board 100 portable and saves storage space, while the wide position can be used when loading objects into a vehicle.

The male component 300 and the female component 200 can be a beam having a C cross-section or a U cross-section. Alternatively, other cross-sections such as I cross-section or rectangular cross-section may be used. Furthermore, the cross-section can be hollow or solid. Additionally, different means for attaching the traction mark 600, the stepping pad 700, and the traction insert 800 can be provided on the surface of the male component 300 and the female component 200. For example, indentations, slots, holes, threaded holes, rough surfaces, locating holes, etc. can be provided.

The traction mark 600 can be formed along the length of the female component 200 on a first side and the traction insert 800 can be attached along the length of the male component 300 on the first side. The traction mark 600 and the traction insert 800 provide traction on the surface of the female component 200 and the male component 300 respectively preventing slippage when a wheel is rolled on the surface of the female component 200 and the male component 300, or when a person walks on the running board 100. The stepping pad 700 can be attached along the length of the female component 200 on a second side. The stepping pad 700 can be fixed to the female component 200 or the stepping pad 700 can slide along the length of the female component 200. The sliding stepping pad 700 can be used to load heavy objects in a vehicle, while the fixed stepping pad 700 can prevent slipping when stepped on the running board 100.

In the narrow position of the running board 100, the female component 200 completely encloses the male component 300 to form a rectangular box. Further, in the narrow position, the running board 100 is removably fitted with a first end cap 101 and a second end cap 103. The first end cap 101 and the second end cap 103 can cover the female component 200 and the male component 300, when configured in a narrow position. The first end cap 101 and the second end cap 103 have smooth edges. The first end cap 101 is locked in place at a first end of the running board 100 with a first cap lock 102, while the second end cap 103 is locked in place at a second end of the running board 100 with a second cap lock 104. The first cap lock 102 and the second cap lock 104 can be a push clip that engages with holes in the male component 300 to snap the first end cap 101 and the second end cap 103, respectively, in a locked state. The first cap lock 102 and the second cap lock 104 can be pushed to disengage the clip from the holes of the male component 300, thus unlocking the first end cap 101 and the second end cap 103. Alternatively, other locking mechanism can be used to hold the first end cap 101 and the second end cap 103 in place. For example, providing grooves on the female component 200 for snap fitting, clip lock, holes for pin lock, bands, etc.

Figure 2A:
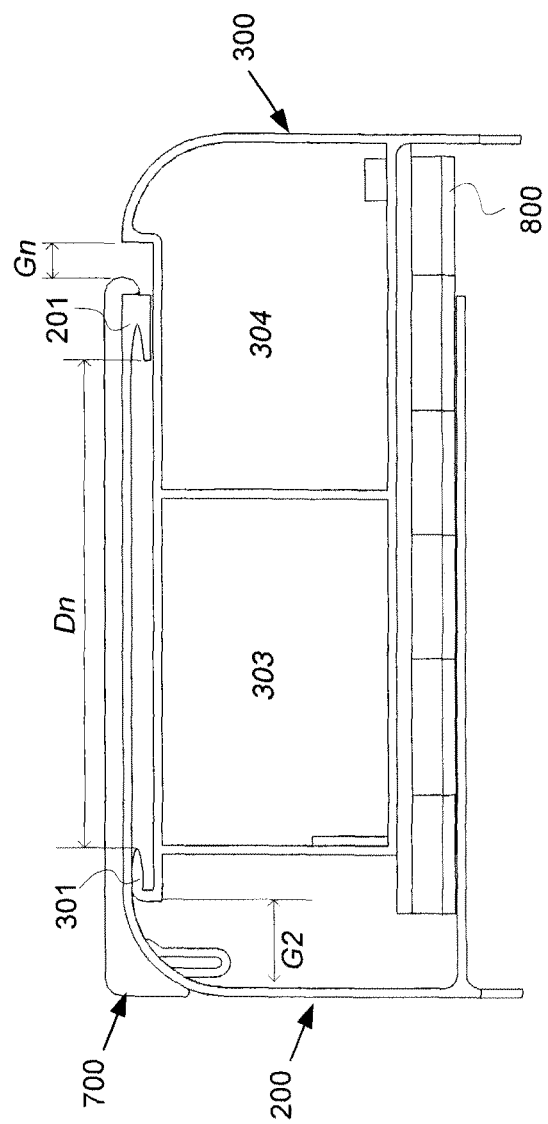
FIG. 2A is a section view of an exemplary running board in a narrow position according to an embodiment of the present disclosure.

FIG. 2A is a section view of an exemplary running board 100 when in a narrow position according to an embodiment of the present disclosure. The male component 300 has a hollow rectangular cross-section with two hollow rectangular sections 303 and 304. An edge of the male component 300 can be rounded for smoothness, or appearance purposes. Further, along an external circumference of the male component 300, a male hook 301 is formed. Furthermore, the male component 300 can be attached with the traction insert 800. On the other hand, the female component 200 has a C or a U cross-section having a female hook 201 along an internal circumference.

When the male component 300 is inserted in the female component 200, the female hook 201 and the male hook 301 are separated by a distance Dn. Further, a narrow gap Gn can be maintained between the female hook 201 and an outer edge of the male component 300 to create space for external attachments to female component 200. An external attachment can be the stepping pad 700 as discussed earlier in the disclosure. Furthermore, a gap G2 can be maintained between the male hook 301 and an inner edge of the female component 200 to provide space for attachments required to fix external components such as a stepping pad 700. The gap G2 may be created due to a rounded edge of the female component 200.

Figure 2B:
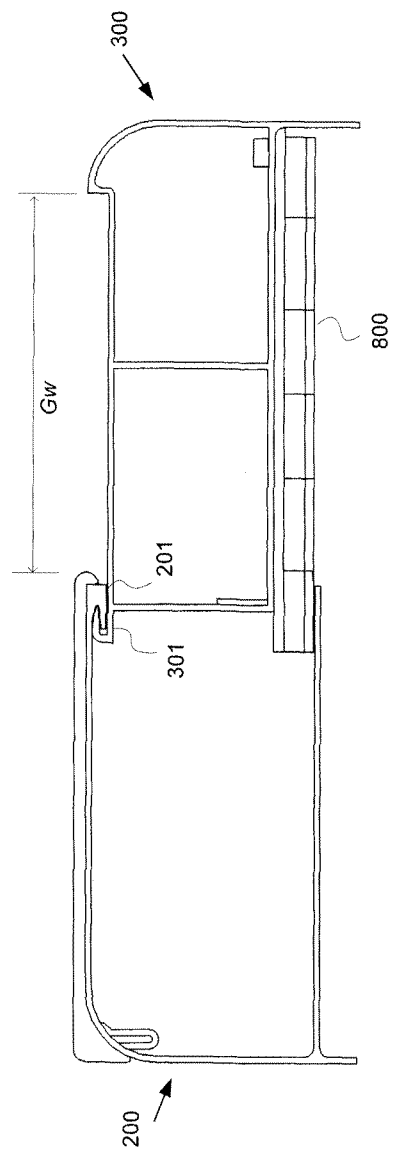
FIG. 2B is a section view of an exemplary running board in a wide position according to an embodiment of the present disclosure.

FIG. 2B is a section view of an exemplary running board 100 when in a wide position according to an embodiment of the present disclosure. When the male component 300 is slide away from the female component 200, the male hook 301 and the female hook 201 are engaged, thus preventing complete separation of the male component 300 from the female component 200. The gap between the female hook 201 and the outer edge of the male component 300 increases to a wide gap Gw, while the distance between the hook is proximately equal to zero. The engagement of the female hook 201 and the male hook 301 can also serve as a rib in the center of the running board 100 for increased support and structural rigidity, increasing load bearing capacity.

Figure 3A:
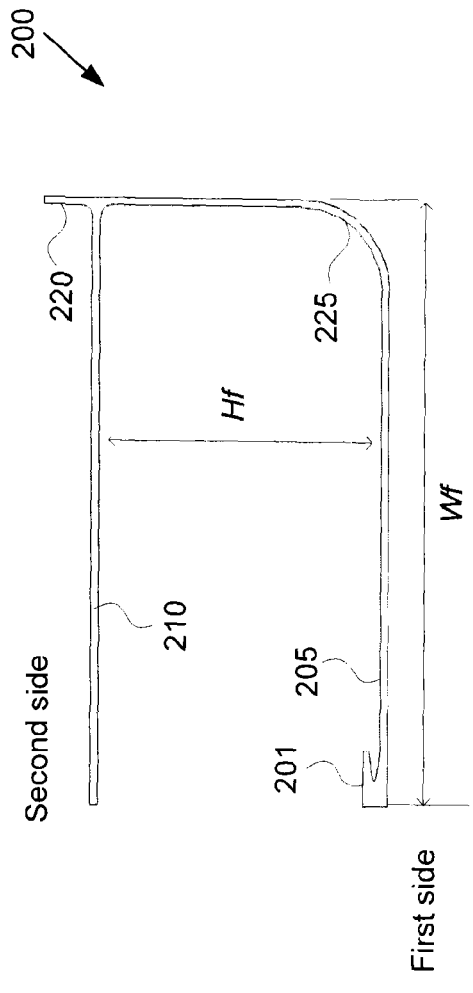
FIG. 3A is an elevation view of an exemplary female component according to an embodiment of the present disclosure.

FIG. 3A is an elevation view of an exemplary female component 200 according to an embodiment of the present disclosure. The female component 200 can have a hollow cross-section or a hollow portion such as in a significantly C-shaped cross-section. Further, the C-shaped cross-section of the female component 200 can include a first hook surface 205 on a first side and a first traction surface 210 on a second side. The first hook surface 205 and the first traction surface 210 can be of a width Wf. The first hook surface 205 and the first traction surface 210 can be separated by a height Hf. The first hook surface 205 on the first side (bottom side in FIG. 3A) of the female component 200 includes a female hook 201. The female hook 201 can be turned inwards, i.e., towards a hollow portion of the C-shape, at an open end of the female component 200. The female hook 201 can be inclined, or parallel to the first hook surface 205. The gap between the female hook 201 and the first hook surface 205 must be sufficient enough to engage with the male hook 301 of the male component 300. Further, the female component 200 has a first curved edge 225 at the closed end for smoothness. A second side of the female component 200 includes a first projection 220 significantly perpendicular to the first traction surface 210. The first projection 220 can prevent objects from sliding off the female component 200 while loading objects, for example, a dolly with wheels carrying a box.

Figure 3B:
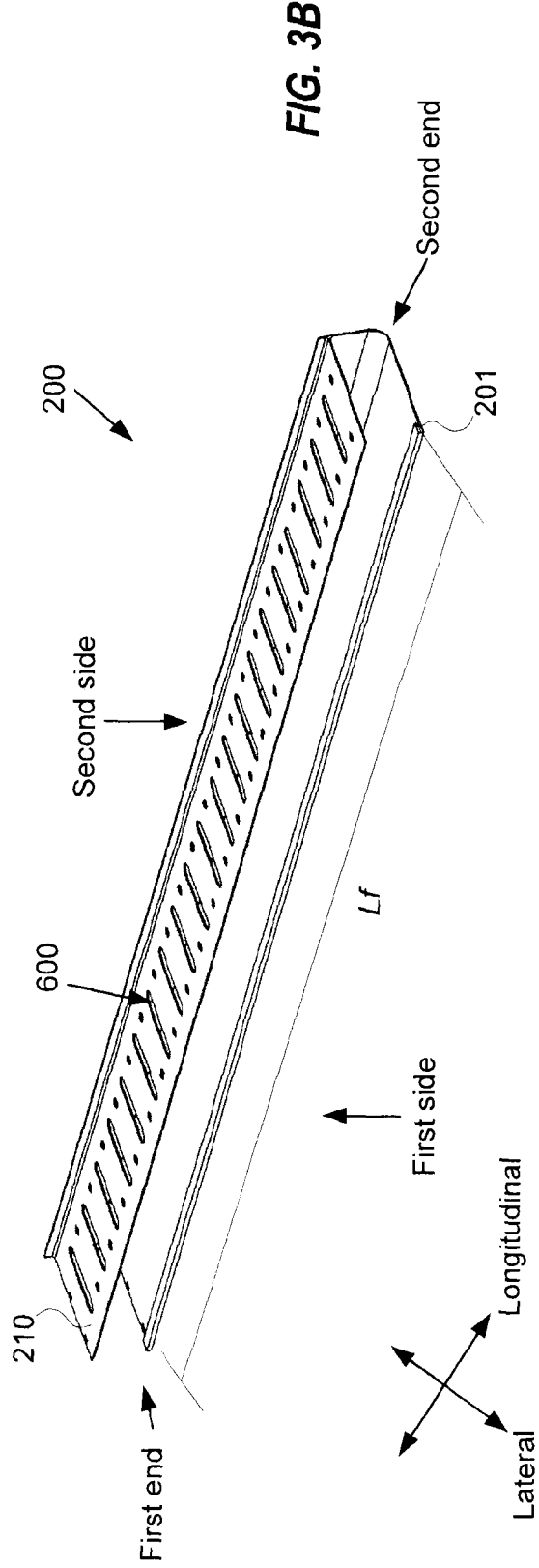
FIG. 3B is a perspective view of an exemplary female component according to an embodiment of the present disclosure.

FIG. 3B is a perspective view of an exemplary female component 200 according to an embodiment of the present disclosure. The female component 200 can be of length Lf. The first traction surface 210 includes a plurality of traction marks such as traction mark 600. The traction mark 600 can be of different shapes and forms such as slots, holes, rough surface, or a combination of thereof. The female hook 201 extends along the length Lf of the female component 200. Alternatively, the female hook 201 can extend partially along the length Lf of the female component 200. For instance, the female hook 201 can be formed at the first end, at the second end, in the middle of the female component 200, or a combination thereof.

Figure 4A:
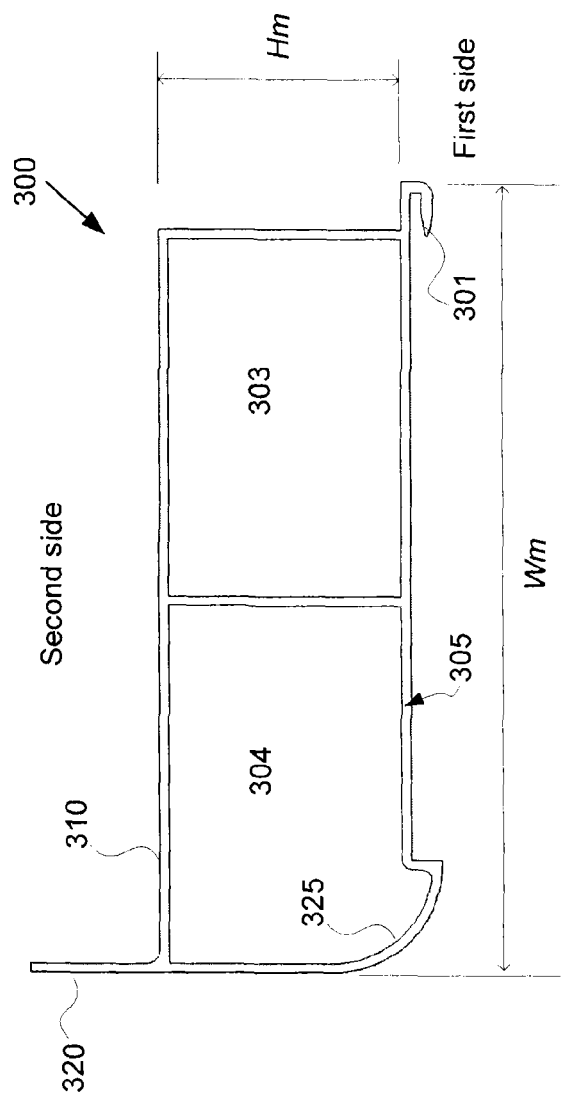
FIG. 4A is an elevation view of an exemplary male component according to an embodiment of the present disclosure.

FIG. 4A is an elevation view of an exemplary male component 300 according to an embodiment of the present disclosure. The male component 300 has a significantly rectangular cross-section with a second hook surface 305 on the first side and a second traction surface 310 on the second side. The rectangular cross-section can be further divided into a plurality of rectangular sections for increased structural strength and load bearing capacity. For example, the male component 300 includes two rectangular sections 303 and 304. The rectangular sections 303 and 304 can be formed along the entire length of the male component 300 or partially at the ends of the male component 300.

The male component 300 can be of a width Wm and height Hm. The width Wm of the male component 300 is greater than or equal to the width Wf of the female component 200 and height Hm of the male component 300 is smaller than the height Hf of the female component 200, as such allowing the rectangular cross-section of the male component 300 to be fitted within the C cross-section of the female component 200.

The second hook surface 305 on the first side (bottom side in FIG. 4A) of the male component 300 includes a male hook 301, which projects outside the rectangular section 303 and bends away from the hollow rectangular section 303. The male hook 301 can be inclined, or parallel to the second hook surface 305. The gap between the male hook 301 and the second hook surface 305 must be sufficient enough to engage with the female hook 201 of the female component 200. Further, the male component 300 has a second curved edge 325 that extends slightly beyond the second hook surface 305. The second side of the male component 300 includes a second projection 320 significantly perpendicular to the second traction surface 310. The second projection 320 can prevent objects from sliding off the male component 300 while loading objects, for example, a dolly with wheels carrying a box or a wheel chair.

Figure 4B:
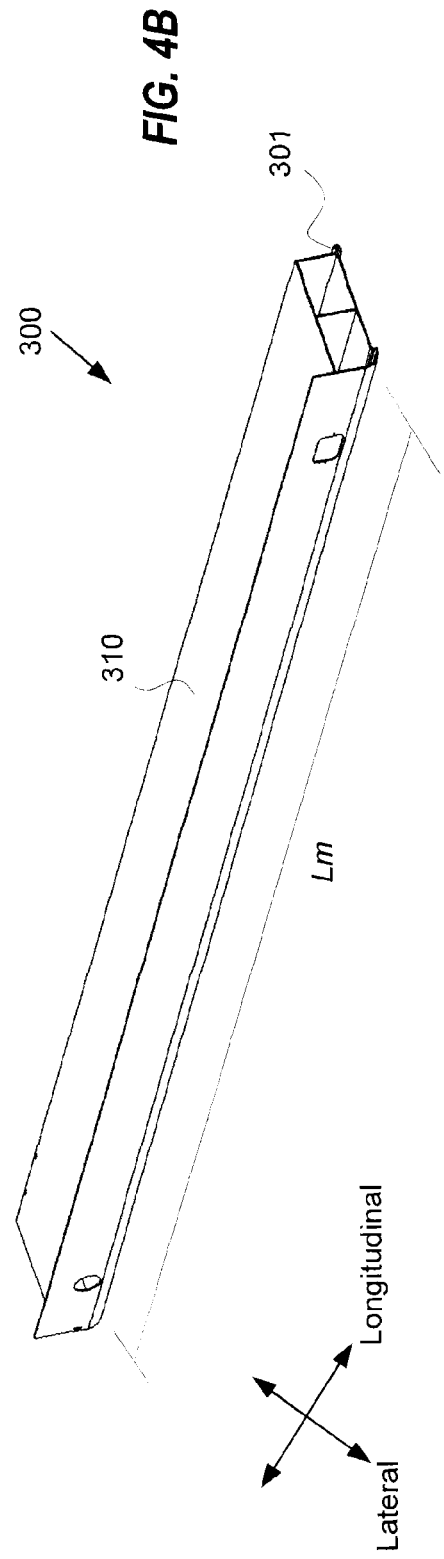
FIG. 4B is a perspective view of an exemplary male component according to an embodiment of the present disclosure.

FIG. 4B is a perspective view of an exemplary male component 300 according to an embodiment of the present disclosure. The male component 300 can be of length Lm, which can be significantly equal to the length Lf of the female component 200. The second traction surface 310 can include holes or slots for attachments such as the traction insert 800 (not shown). The male hook 301 extends along the length Lm of the male component 300. Alternatively, the male hook 301 can extend partially along the length Lm of the male component 300. For instance, the male hook 301 can be at a first end, at a second end, in the middle, or a combination thereof. Further, along the second projection 320 one or more holes or slots can be created for various purposes such as viewing the hollow section of the male component 300, adding attachments, etc.

Figure 5:
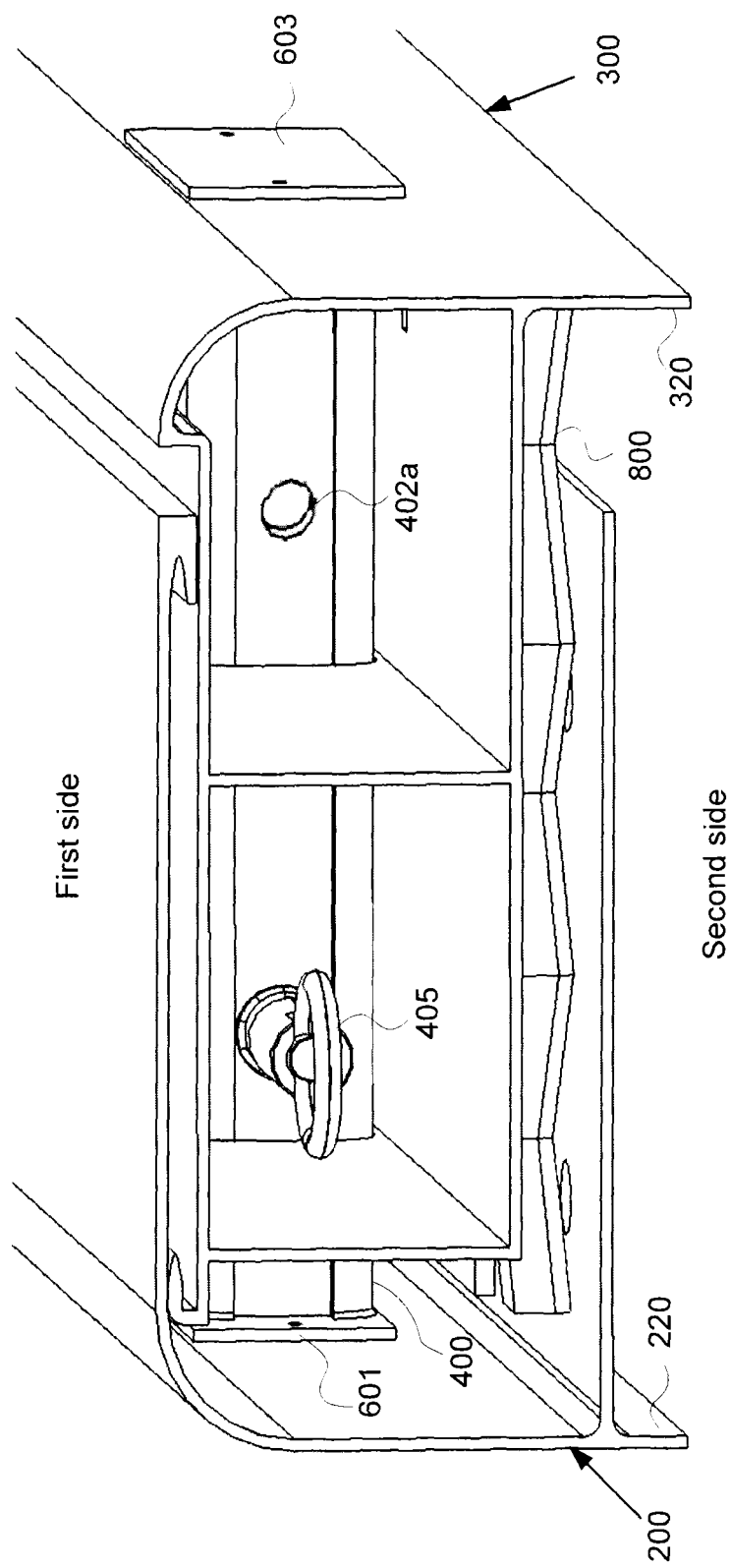
FIG. 5 is a perspective view of a first end of the running board showing internal details according to an embodiment of the present disclosure.

FIG. 5 is a perspective view of a first end of the running board 100 showing internal details according to an embodiment of the present disclosure. The female component 200 and the male component 300 are connected by a position locking device 400, at the first end of the running board 100. The position locking device 400 includes a plurality of holes (not shown in FIG. 5) and a locking pin 405, which can be spring loaded or manually operable and can rest in a hole of the position locking device 400. The position locking device 400 is fixed to the female component 200 using a first plate 601 and to the male component 300 using the second plate 603. The first plate 601 and the second plate 603 can be fixed using different type of fasteners. For example, screws, rivets, glue, welding, etc. The female component 200 and the male component 300 can be moved relative to each other by pulling out the locking pin 405 from the hole of the position locking device 400. After moving the female component 200 and the male component 300, the locking pin 405 can be placed back in a different hole of the position locking device 400 to lock the female component 200 and the male component 300 in a particular position such as a narrow position, a wide position or an intermediate position. For example, the running board 100 can be locked in a narrow position, when not in use, and mounted or stored on a vehicle in a compact manner. Similarly, when the running board 100 is used to load objects in the vehicle, the running board 100 can be locked in a wide position for stability.

Figure 6:
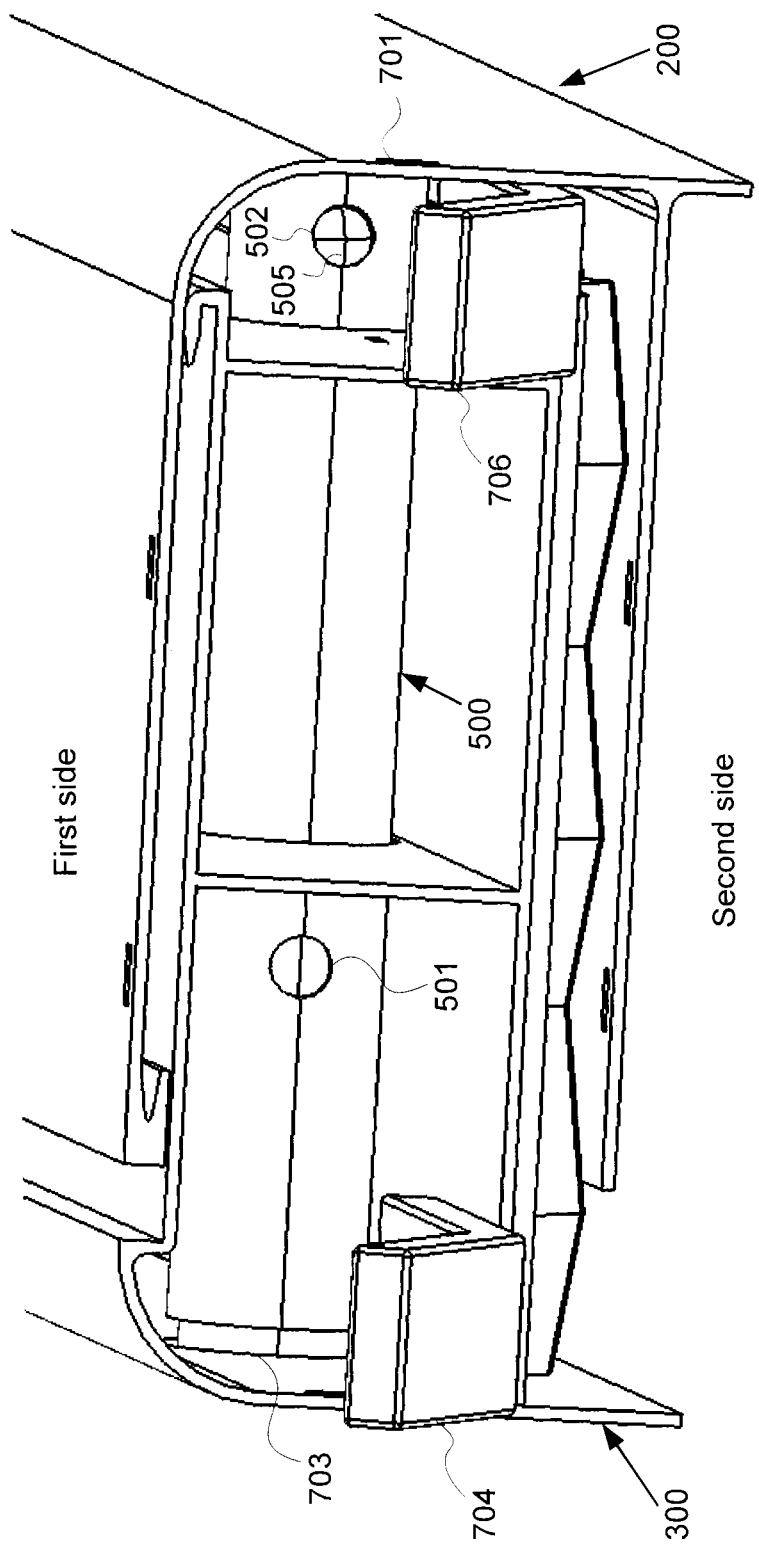
FIG. 6 is a perspective view of a second end of the running board showing internal details according to an embodiment of the present disclosure.

FIG. 6 is a perspective view of a second end of the running board 100 showing internal details according to an embodiment of the present disclosure. At the second end of the running board 100, the female component 200 and the male component 300 can be connected by a position guiding device 500. The position guiding device 500 includes a plurality of holes such as a wide hole 501 and a narrow hole 502, and a spring plunger 505. The position guiding device 500 is fixed to the female component 200 using a third plate 701 and to the male component 300 using the fourth plate 702. The third plate 701 and the fourth plate 702 can be fixed using different fastening methods. For example, screws, rivets, glue, welding, etc. The position guiding device 500 helps maintain a position, corresponding to position of the position locking device 400 at the first end, of the female component 200 with respect to the male component 300 at the second end of the running board 100. Positioning the female component 200 and male component 300 at the first end may not translate into same position at the second end due to the length of the running board 100. As such, the position guiding device 500 can assist in maintaining a uniform width of the running board 100 along the entire length of the running board 100.

The spring plunger 505 can lock the running board 100 in a narrow position, a wide position or an intermediate position, similar to the position locking device 400 discussed with respect to FIGS. 7A-7D. The spring plunger 505 can include a shaft with dome shape at a first end and attached to a spring (not shown) at a second end. The shaft of spring plunger 505 can be move in and out of the plurality of holes in the position guiding device 500 on application of a lateral force on the wide hole 501. The lateral force can be exerted, by the edge of a hole, when the female component 200 and the male component 300 are pulled away or push towards each other, causing the spring plunger 505 to compress the spring (not shown). When the spring plunger 505 is aligned with a hole, the spring pushes the shaft of the spring plunger 505 into the hole. Alternatively, the spring plunger 505 can be similar to the locking pin 405 having a loop to apply longitudinal force on the spring plunger 505 to move the spring plunger 505 in and out of a hole.

The second end of the running board 100 can optionally include a first bracket 704 and a second bracket 706 to support the running board 100 when the second end is placed on the ground and first end is placed on the vehicle creating a ramp for loading of objects in a vehicle. Alternative, the first bracket 704 and the second bracket 706 can be an attachment mechanism to the vehicle. The attachment mechanism can prevent sliding of the running board 100 from the vehicle, when the second end is attached to the vehicle and the first end rests on the ground creating a ramp.

FIGS. 7A-7D illustrate the operation of the position locking device according to an embodiment of the present disclosure. The position locking device 400 can include a plurality of holes such as wide lock holes 401a and 401b, narrow lock holes 402a and 402b, and the locking pin 405. The position locking device 400 can be a telescopic tube made of a plurality of tubes arranged coaxially inside each other. In the present disclosure, the position locking device 400 includes two tubes, a first outer tube 410 and a first inner tube 420. The first outer tube 410 and the first inner tube 420 of the position locking device 400 can be attached to the first plate 601 and the second plate 603 respectively. The first outer tube 410 and the first inner tube 420 can be hollow rectangular tubes. Further, each of the first outer tube 410 and first inner tube 420 can include holes for position locking. For example, the first outer tube 410 can include the wide lock hole 401a and the narrow lock hole 402a corresponding to different positions of the running board 100. Similarly, the first inner tube 420 can include the wide lock hole 401b and the narrow lock hole 402b. In certain embodiment, the first outer tube 410 and the first inner tube 420 can have a circular, square, triangular, C, or other appropriate cross-sections. Further, additional holes may be created for intermediate positions of the running board 100.

Figure 7A:
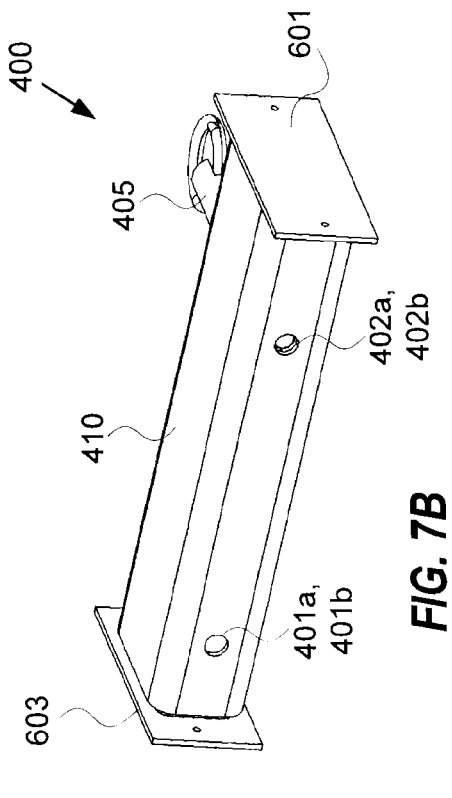
FIG. 7A illustrates the narrow position configuration of the position locking device according to an embodiment of the present disclosure.

FIG. 7A illustrates the narrow position configuration of the position locking device 400. In narrow configuration, the first inner tube 420 is inside the first outer tube 410 and the locking pin 405 is engaged with the narrow lock holes 402a and 402b. The locking pin 405 protrudes from the narrow lock hole 402a to lock the first inner tube 420 inside the first outer tube 410.

Figure 7C:
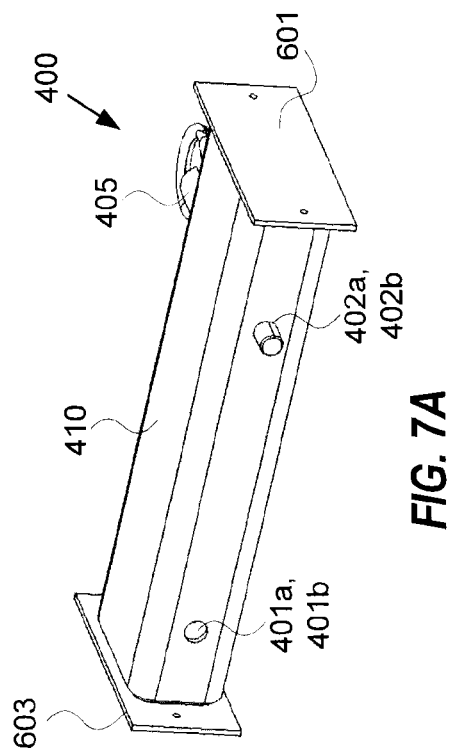
FIG. 7C illustrates the locking pin in an intermediate position according to an embodiment of the present disclosure.
Figure 7B:
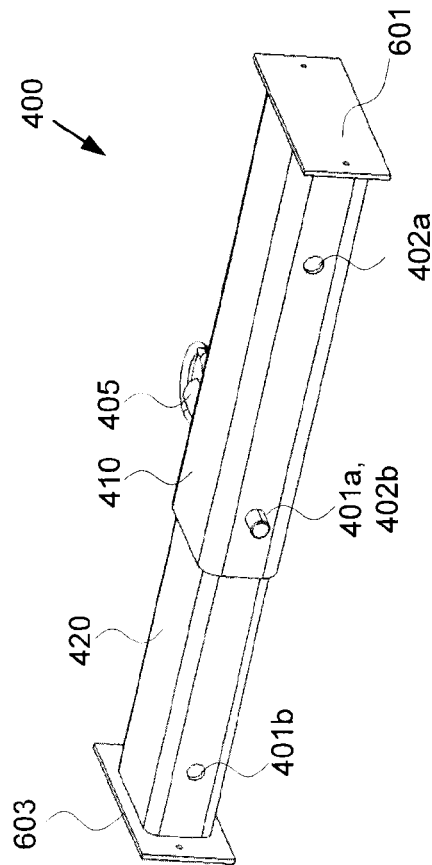
FIG. 7B illustrates the locking pin disengaged from the narrow hole according to an embodiment of the present disclosure.

FIG. 7B illustrates the locking pin 405 disengaged from the narrow hole. The locking pin 405 can be disengaged by pulling out the locking pin 405 from the narrow lock holes 402a and 402b, which allows the first inner tube 420 to slide freely with respect to the first outer tube 410. FIG. 7C illustrates the locking pin 405 in an intermediate position. The first inner tube 420 can be pulled out of the first outer tube 410, as the locking pin 405 is disengaged from the narrow lock holes 402a and 402b. In the intermediate position, the wide hole 401a on the first outer tube 410 is separated from the wide hole 401b on the first inner tube 420.

Figure 7D:
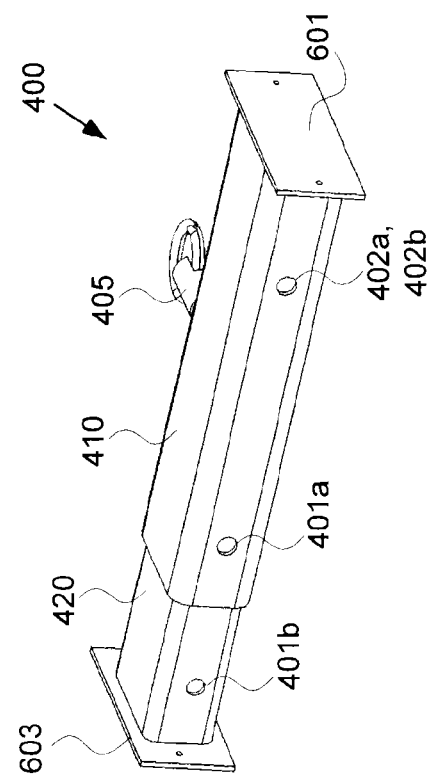
FIG. 7D illustrates the wide position configuration of the position locking device according to an embodiment of the present disclosure.

FIG. 7D illustrates the wide position configuration of the position locking device 400. In wide configuration, the first inner tube 420 is significantly outside the first outer tube 410 and the locking pin 405 is engaged with the wide lock hole 401a of the first outer tube 410, and the narrow lock hole 402b of the inner tube 420. The locking pin 405 protrudes from the wide lock hole 401a to lock the first inner tube 420, thus restricting the free motion of the first inner tube 420 with respect to the first outer tube 410.

In certain embodiments, one or more the locking pin 405 may be used. Further, the locking pin 405 can be inserted only in the first inner tube 410 and not in the first outer tube 420. The position locking device 400 can be configured to generate a different locking pattern based on locking pin inserted in one or more holes in the first inner tube 410 or the first outer tube 420. For example, the first outer tube 420 can include a single hole such as narrow hole 401a, while the wide locking hole 402a may be omitted. On the other hand, the first inner tube 410 can include both the narrow locking hole 401b and the wide locking hole 402b. To create a narrow position, the locking pin 405 can be inserted through the wide locking hole 402a and the narrow locking hole 401b. On the other hand, to create a wide position, the locking pin 405 can be inserted through the wide locking hole 402a and the wide locking hole 402b.

FIGS. 8A-8C illustrate the operation of the position guiding device according to an embodiment of the present disclosure. The position guiding device 500 includes a plurality of holes such as a wide hole 501 and a narrow hole 502 and the spring plunger 505. The position guiding device 500 can be a telescopic cylinder having a plurality of tubes, similar to the position locking device 400. In the present disclosure, the position guiding device 500 includes two tubes, an second outer tube 510 and an second inner tube 520. The second outer tube 510 and the second inner tube 520 of the position guiding device 500 can be attached to the third plate 701 and the fourth plate 702 respectively. Further, the second outer tube 510, the second inner tube 520 or both can include holes such as the wide hole 501 and the narrow hole 502 corresponding to the holes of the position locking device 400. Alternatively, the second outer tube 510 and the second inner tube 520 can have a circular, square, triangular, C, or other appropriate cross-sections. Further, additional holes, corresponding to the holes of the position locking device 400, may be created for intermediate positions.

FIG. 8A illustrates the narrow position configuration of the position guiding device 500 according to an embodiment of the present disclosure. In narrow configuration, the second inner tube 520 is inside the second outer tube 510 and the spring plunger 505 is engaged with the narrow hole 502. The spring plunger 505 slightly protrudes from the narrow hole 502 to lock the second inner tube 520 inside the second outer tube 510. FIG. 8B illustrates an intermediate position of the position guiding device 500 according to an embodiment of the present disclosure. When a force is applied at the third plate 701 or fourth plate 702, the edge of the narrow hole 502 pushes and compresses the spring plunger 505 allowing relative motion between the second outer tube 510 and the second inner tube 520. The second inner tube 520 can be pulled out of the second outer tube 510, when the spring plunger 505 is disengaged from the narrow hole 502. FIG. 8C illustrates the wide position configuration of the position guiding device 500 according to an embodiment of the present disclosure. As the second inner tube 520 extends and is significantly outside the second outer tube 510 and the spring plunger 505 is engaged with the wide hole 501. The spring plunger 505 snaps into the wide hole 501 protruding slightly to lock the second inner tube 520 restricting the free motion of the second inner tube 520 with respect to the second outer tube 510.

The length of the first outer tube 410 and the first inner tube 420 of the position locking device 400, and the second outer tube 510 and the second inner tube 520 of the position guiding device 500 are substantially equal. Further, the distance of the wide lock hole 401 (and the narrow lock hole 402) and the wide hole 501 (and the narrow hole 502) from the first plate 601 (the 602) and the third plate 701 (the fourth plate 702), respectively, are substantially equal.

In certain embodiment, the position guiding device 500 can include a second inner tube 520 with holes. Further, the position guiding device 500 can be configured and operated in a similar manner as the position guiding device 400 discussed with respect to the FIGS. 7A-7D.

Figure 9A:
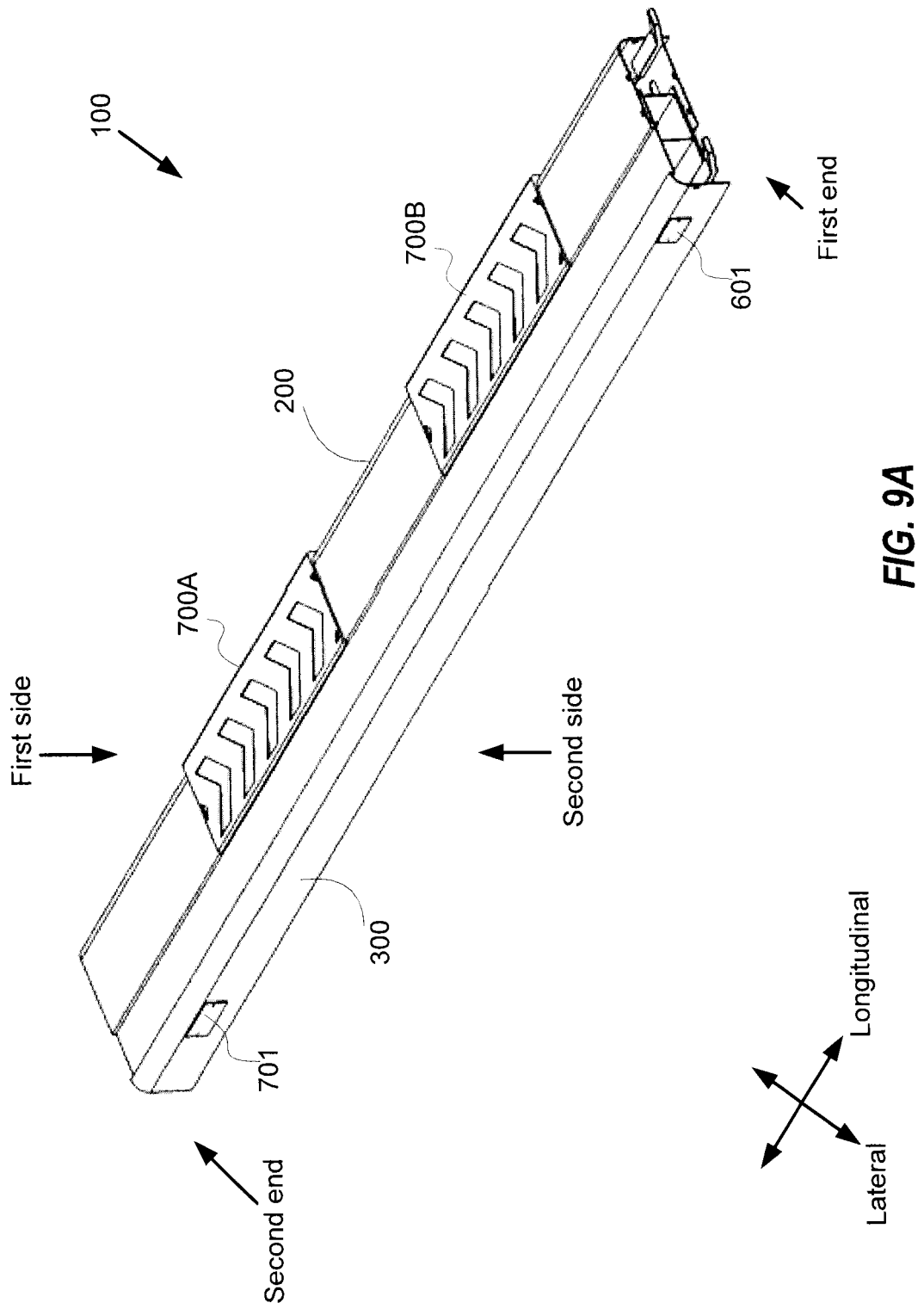
FIG. 9A illustrates the running board in an intermediate position according to an embodiment of the present disclosure.
Figure 9B:
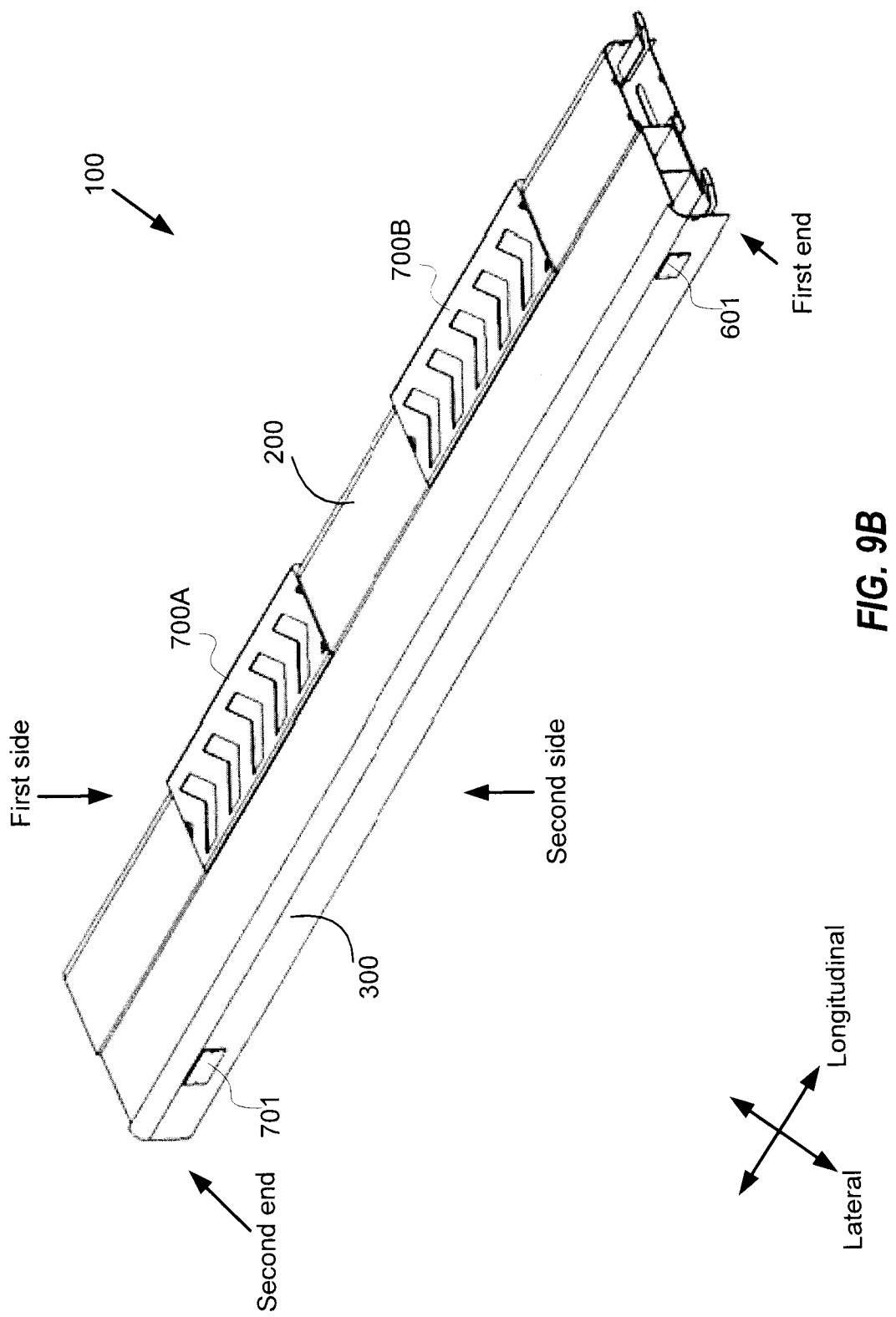
FIG. 9B illustrate the running board in a wide position according to an embodiment of the present disclosure.

FIGS. 9A and 9B illustrate the running board 100 in an intermediate position and a wide position according to an embodiment of the present disclosure. In FIG. 9A, when the locking pin 405 (not visible) is unlocked, the male component 300 can be pulled away from the female component 200. FIG. 9B, illustrates the wide position of the running board 100 that is formed when the locking pin 405 (not visible) engages with the wide lock hole 401 (not shown). The position locking device 400 (not visible) is connected to the first plate 601 at the first end and the position guiding device 500 (not visible) is connected to the third plate 701 at the second end. The female component 200 can be attached with two stepping pads 700A and 700B on the first side. The two stepping pads 700A and 700B can be fixed or slidably attached to the female component 200. When slidably attached, the stepping pads 700A and 700B can slide freely from the first end to the second end or vice-versa. Alternately, a locking mechanism can be included to lock the stepping pads 700A and 700B to prevent back sliding of an object being loaded up the inclined ramp into the vehicle.

Figure 10:
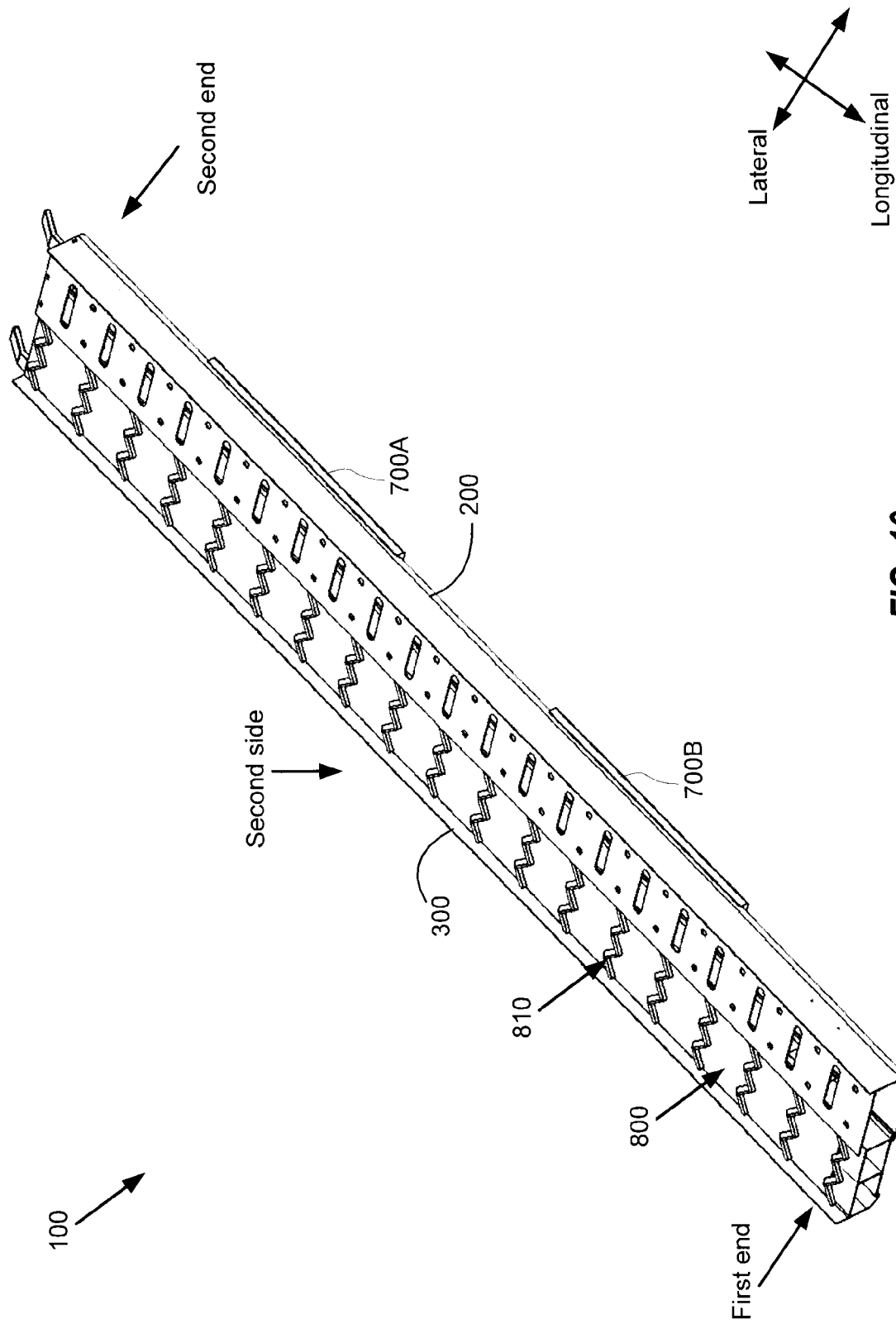
FIG. 10 illustrates the second side of the running board in a wide position according to an embodiment of the present disclosure.

FIG. 10 illustrates the second side of the running board 100 in a wide position according to an embodiment of the present disclosure. The second side of the running board 100 includes traction elements to enable rolling of wheels along the running board 100. For example, the traction elements can be the traction insert 800 attached to the male component 300 and the traction mark 600 formed on the female component 200. The traction insert 800 includes a series of rough surface such as plurality of ridges 810. The plurality of ridges 810 can be made of plastic, rubber or other appropriate material for gripping purposes. The traction insert 800 is removably attached to the male component 300, as such, when the traction insert 800 is worn out due to over use, it can be replaced. In another embodiment, the traction mark 600 can be created on the male component 300 and the traction insert 800 can be removably attached to the female component 200. It can be understood by a person skilled in art that the traction insert 800 and the traction mark 600 can be used by itself or in combination on the female component 200 or the male component 300.

Figure 11A:
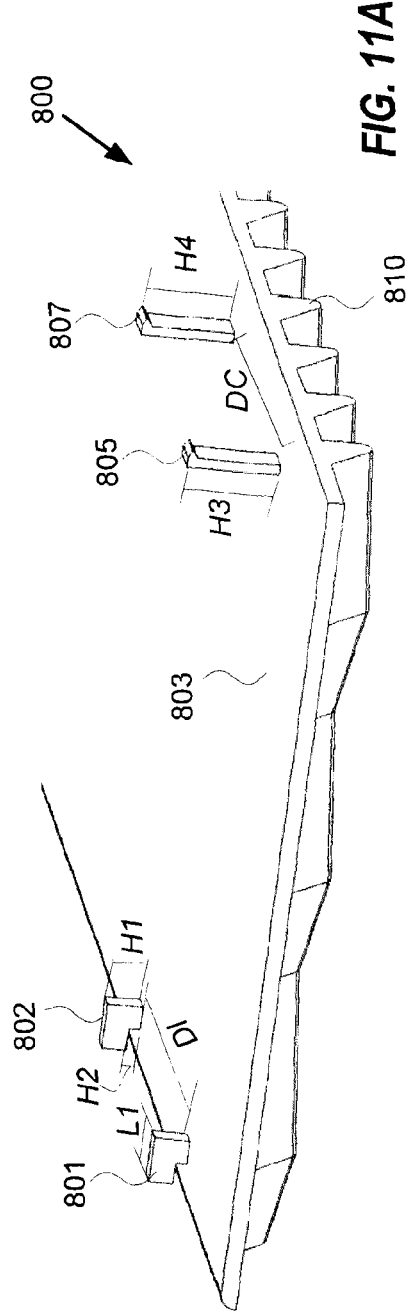
FIG. 11A illustrates the traction insert attached to the male component according to an embodiment of the present disclosure.

FIG. 11A illustrates the traction insert 800 according to an embodiment of the present disclosure. The traction insert 800 includes a plurality of locators 801 and 802 and a plurality of clips 805 and 807 on the surface 803 at the back of the plurality of ridges 810. The plurality of locators 801 and 802 can be L-shaped with height H1 and length L1. The plurality of locators 801 and 802 are fixed to the surface 803 such that a gap H2 is maintained between the surface 803 and the leg of the plurality of locators 801 and 802. Furthermore, the plurality of locators 801 and 802 are separated by a distance Dl. The plurality of locators 801 and 802 can be fixed close the one edge of the surface 803, while the plurality of clips 805 and 807 can be fixed close to the other edge of the surface 803. The plurality of clips 805 and 807 can be L-shaped with height H3. The plurality of clips 805 and 807 are fixed to the surface 803 such that a gap H4 is maintained between the surface 803 and the base of the plurality of clips 805 and 807. Furthermore, the plurality of clips 805 and 807 are separate by a distance Dc. The gaps H2 and H4 should be greater than or significantly equal to the thickness of the surface 360 or 361 (shown in FIG. 11B) of the male component 300.

In another embodiment, the locators can be omitted or the clips can be omitted. Further, the locators or the clips can be arranged in a particular pattern such as triangle, circular, rectangular or other appropriate patterns. In a different embodiment, the surface 803 can include other attachment mechanism such as clips that can snap into the holes made in the surface 360 or 362 (in FIG. 11B) of the male component 300. Alternatively, other attachment mechanism such as an adhesive, screws or rivets can be used.

Figure 11B:
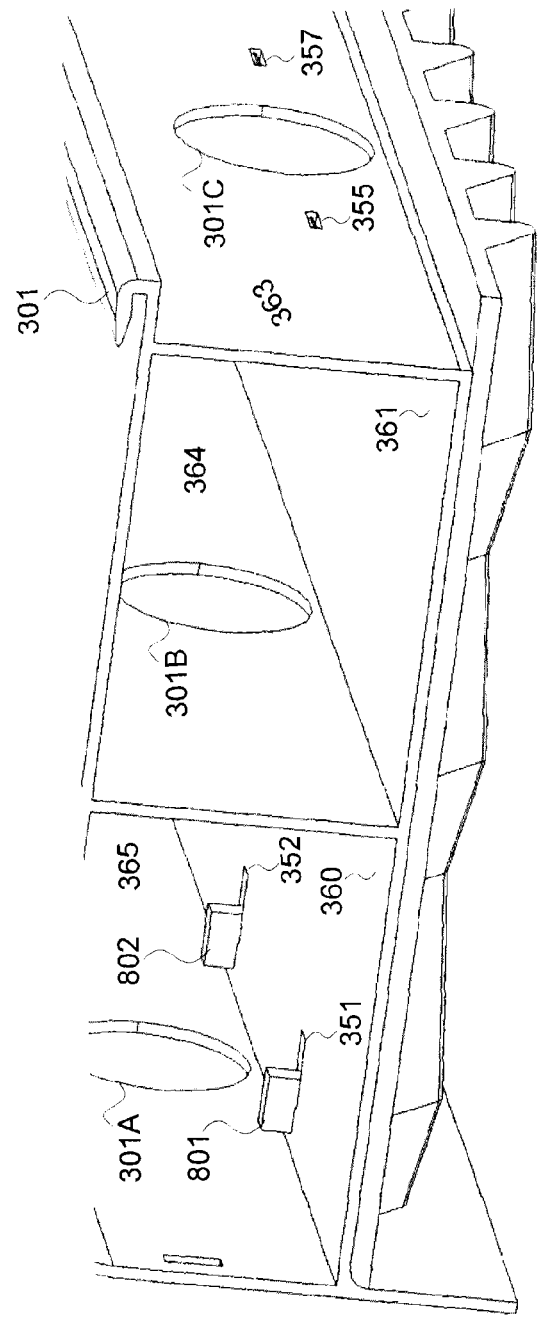
FIG. 11B illustrates the attachment of the traction insert to the male component according to an embodiment of the present disclosure.

FIG. 11B illustrates the traction insert 800 attached to the male component 300 according to an embodiment of the present disclosure. The male component 300 can include a plurality of locator holes 351 and 352 on a surface 360, and clip holes (not shown) on the surface 361 and a plurality of clip holes 355 and 357 on a vertical surface 363. The plurality of locator holes 351 and 352 can be rectangular slots separated by a distance Dl corresponding to the plurality of locators 801 and 802 of the traction insert 800. Similarly, the plurality of clip holes 355 and 357 can be rectangular slots on the plurality of clip holes 355 and 357 at a height H4 corresponding to the gap H4 of the plurality of clips 805 and 807 and the plurality of clip holes 355 and 357 can be separated by a distance Dc corresponding to the distance between plurality of clips 805 and 807. Furthermore, clip holes can be made on the surface 361 so as to insert the plurality of clips 805 and 807 and engage the plurality of clips 805 and 807 with the plurality of clip holes 355 and 357. Once attachment mechanisms are provided on the male component 300, the traction insert 800 can be attached to the male component 300 such that the plurality of ridges 810 projects away from the male hook 301.

Further, positioning holes 301A, 301B, and 301C can be drilled through the vertical surfaces 363, 364, and 365 respectively to install the position locking device 400 or position guiding device 500 within running board 100.

Figure 12B:
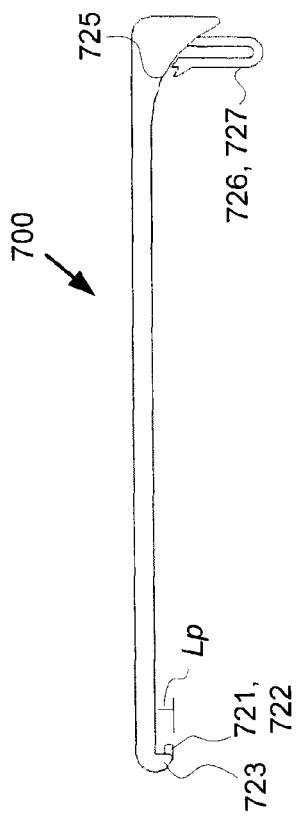
FIG. 12B is an elevation view of the exemplary stepping pad according to an embodiment of the present disclosure.
Figure 12D:
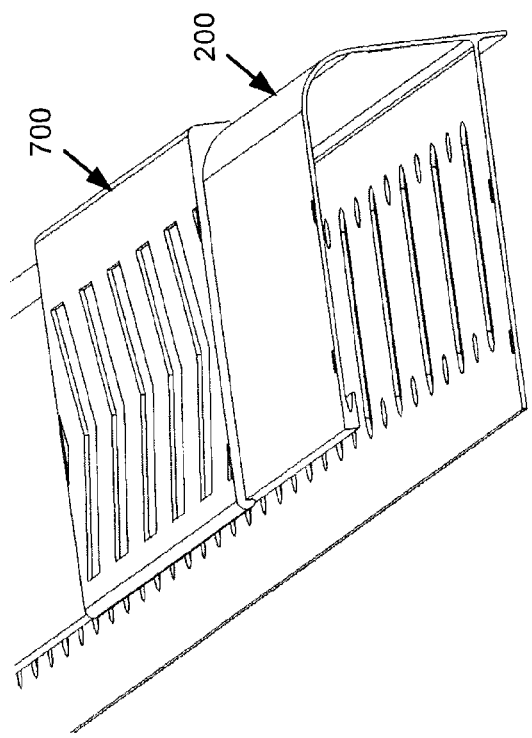
FIG. 12D illustrates a perspective view of a stepping pad attached to the female component according to an embodiment of the present disclosure.
Figure 12A:
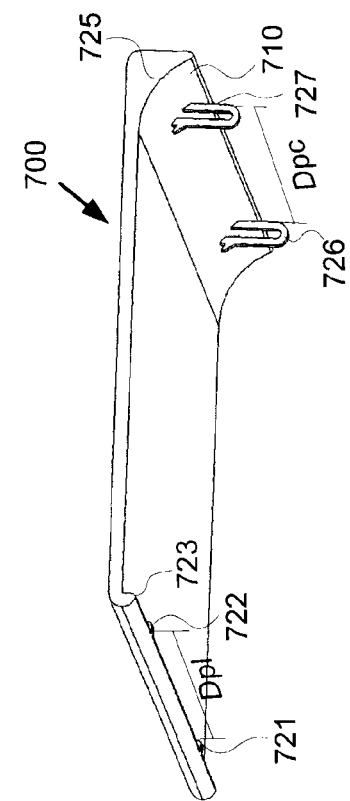
FIG. 12A is a perspective view of an exemplary stepping pad according to an embodiment of the present disclosure.

FIG. 12A is a perspective view of an exemplary stepping pad and FIG. 12B is an elevation view of the exemplary stepping pad according to an embodiment of the present disclosure. The stepping pad 700 can be a fixed type of stepping pad. The stepping pad 700 can include a plurality of pad locators 721 and 722, a pad projection 723, and a pad leg 710. Optionally, the stepping pad 700 can include a pad curve 725. The plurality of pad locators 721 and 722 protrude from the pad projection 723 and are separated by a distance Dpl. The length of the pad projection 723 is less than or significantly equal to the thickness of the female component 200 at the female hook 201 end. The plurality of pad clips 726 and 727 are fixed to the pad leg 710 at a distance Dpc. The plurality of pad clips 726 and 727 are U-shaped clips that can be flexible.

The plurality of pad locators 721 and pad projection 723 are used to position the stepping pad 700 with respect to a mounting component and the plurality of pad clips 726 and 727 are used to lock the stepping pad 700 securely to the mounting component. The plurality of pad locators 721 and pad projection 723 and the plurality of pad clips 726 and 727 prevents sliding motion with respect to the mounting component. The stepping pad 700 can be unlocked from the mounting surface by pressing the plurality of pad clips 726 and 727 and the stepping pad 700 can be removed from the mounting surface.

Figure 12C:
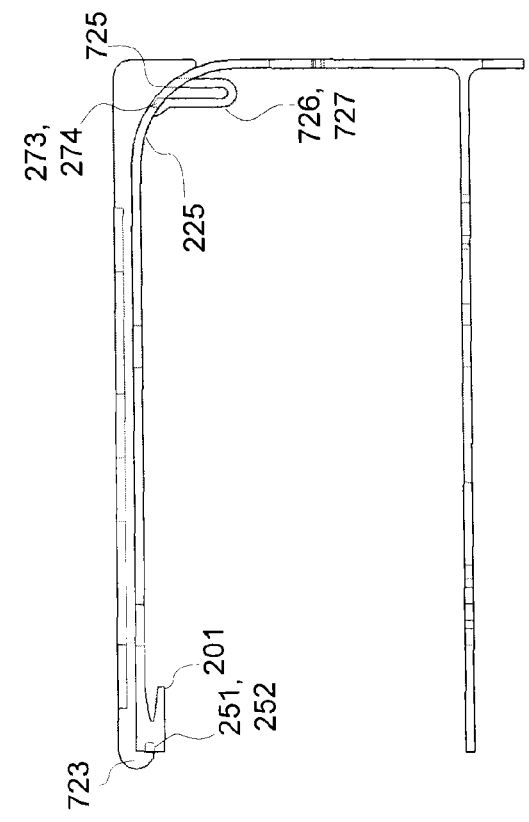
FIG. 12C is an elevation view of a stepping pad attached to the female component according to an embodiment of the present disclosure.

FIG. 12C is an elevation view of a stepping pad attached to the female component 200 according to an embodiment of the present disclosure. The female component 200 includes a plurality of pad locator holes 251 and 252, and a plurality of pad clip holes 273 and 274. The plurality of pad locator holes 251 and 252 are made along the surface of the female hook 201. The distance between the plurality of pad locator holes 251 and 252 can be significantly equal to the distance Dpl between the plurality of pad locators 721 and 722. The plurality of pad locators 721 and pad projection 723 are engaged with the plurality of pad locator holes 251 and 252 and the pad projection 723 is flushed against the female hook 201. The plurality of pad clip holes 273 and 274 are made along the surface of the first curved edge 225. The distance between the plurality of pad clip holes 273 and 274 can be significantly equal to the distance Dpc between the plurality of pad locators 721 and 722. Once the plurality of pad locators 721 and 722 are engaged with the plurality of pad locator holes 251 and 252, the plurality of pad clips 726 and 272 can be engaged with the plurality of pad clip holes 273 and 274 respectively. The plurality of pad clips 726 and 727 are deflected through the plurality of pad clip holes 273 and 274 till the plurality of pad clips 726 and 727 snap into place on the inside of the female component 200. FIG. 12D illustrates a perspective view of a stepping pad attached to the female component 200 according to an embodiment of the present disclosure.

In another embodiment, the stepping pad 700 can be slidably attached to the female component 200. For example, the plurality of pad locator holes 251 and 252 and the pad curve 725 can be a groove extending along the length of the female component 200. As such, the plurality of pad locators 721 and 722 and the plurality of pad clips 726 and 727 can slide freely, within the grooves. Alternatively, the plurality of pad clip holes 273 and 274 and the plurality of pad clips 726 and 727 can be omitted, and different sliding arrangement can be constructed. For instance, a groove can be formed on a top surface of the female component 200 and a projection can be formed on a bottom surface of the stepping pad 700. The projection can be a pin or a wheel. The projection of the stepping pad 700 can be engaged with the groove of the female component 200 in a sliding manner. The present disclosure is not limited the disclosed sliding mechanism and other sliding mechanism can be used to attach the stepping pad 700 to the female component 200.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A running board apparatus comprising:
a first component with a hollow cross-section having an open end, the first component extending in a longitudinal direction;
a second component with a closed cross-section that slides relative to the first component in a lateral direction, the second component extending in the longitudinal direction; and
a positioning device with a first end attached to the first component and a second end attached to the second component, the positioning device is configured to move the second component with respect to the first component in the lateral direction and lock the second component and the first component in a plurality of positions,
wherein the first component includes at least one stepping pad on a first side of the first component.

2. A running board apparatus comprising:
a first component with a hollow cross-section having an open end, the first component extending in a longitudinal direction;
a second component with a closed cross-section that slides relative to the first component in a lateral direction, the second component extending in the longitudinal direction; and
a positioning device with a first end attached to the first component and a second end attached to the second component, the positioning device is configured to move the second component with respect to the first component in the lateral direction and lock the second component and the first component in a plurality of positions,
wherein the first component includes a plurality of traction marks on a second side.

3. The running board apparatus according to claim 2, wherein
the plurality of traction marks on the second side of the first component include at least one of a plurality of slots and a plurality of holes.

4. The running board apparatus according to claim 1, wherein
the first component includes a first hook at the open end that extends in the longitudinal direction.

5. The running board apparatus according to claim 4, wherein
the second component includes a second hook that contacts the first hook to define a maximum distance the second component can slide relative to the first component in the lateral direction.

6. A running board apparatus comprising:
a first component with a hollow cross-section having an open end, the first component extending in a longitudinal direction;
a second component with a closed cross-section that slides relative to the first component in a lateral direction, the second component extending in the longitudinal direction; and
a positioning device with a first end attached to the first component and a second end attached to the second component, the positioning device is configured to move the second component with respect to the first component in the lateral direction and lock the second component and the first component in a plurality of positions,
wherein the positioning device includes at least two tubes with a first hole, a second hole, and a locking pin, wherein the locking pin is inserted in the first hole to arrange the running board in a first position and the locking pin is inserted in the second hole to arrange the running board in a second position that is wider than the first position.

7. The running board apparatus according to claim 6, wherein
the at least two tubes of the positioning device are arranged in a telescopic manner, wherein an inner tube of the at least two tubes is slidably inserted inside an outer tube of the at least two tubes.

8. The running board apparatus according to claim 7, wherein
the at least two tubes of the positioning device have a hollow rectangular cross-section.

9. A running board apparatus comprising:
a first component with a hollow cross-section having an open end, the first component extending in a longitudinal direction, the first component being removably fitted with a first end cap;
a second component with a closed cross-section that slides relative to the first component in a lateral direction, the second component extending in the longitudinal direction, the second component being removably fitted with a second end cap; and
a positioning device with a first end attached to the first component and a second end attached to the second component, the positioning device is configured to move the second component with respect to the first component in the lateral direction and lock the second component and the first component in a plurality of positions,
wherein the plurality of positions includes a narrow position and a wide position, and
wherein the first end cap and the second cap are respectively locked into the first component and the second component in the narrow position.

* * * * *